Feb. 11, 1930.                    W. E. GIBBS                    1,746,391
                              METAL WORKING FILE
                              Filed Dec. 3, 1926
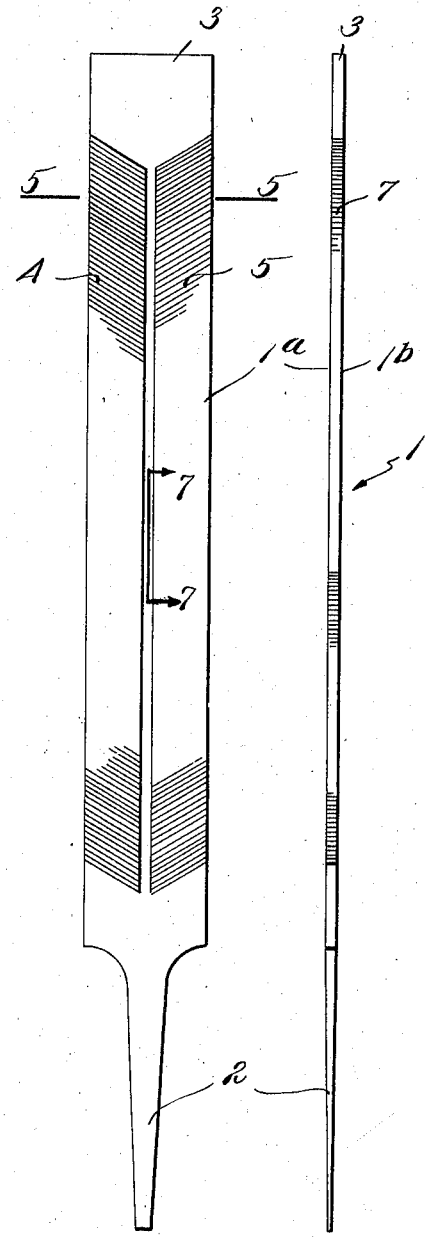
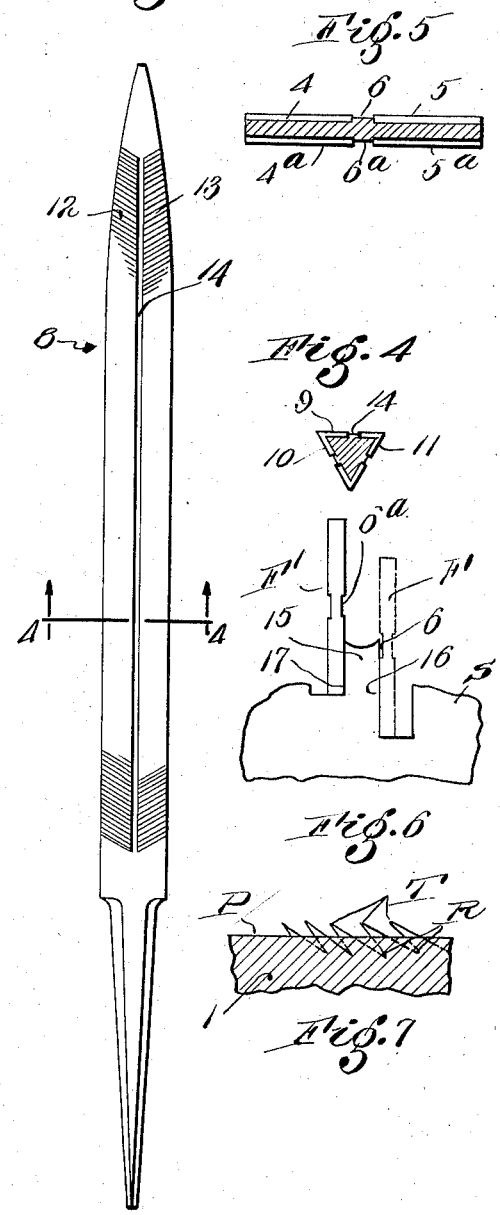
Inventor
William E. Gibbs,
by Roberts Cushman & Woodberry
Attys.

Patented Feb. 11, 1930

1,746,391

UNITED STATES PATENT OFFICE

WILLIAM E. GIBBS, OF SAN FRANCISCO, CALIFORNIA, ASSIGNOR TO SIMONDS SAW AND STEEL COMPANY, OF FITCHBURG, MASSACHUSETTS, A CORPORATION OF MASSACHUSETTS

METAL-WORKING FILE

Application filed December 3, 1926. Serial No. 152,363.

This invention pertains to metal-working files, and more particularly to files primarily intended for sharpening saws, although not necessarily limited to such use. In sharpening saw teeth it is customary for the operator to file one edge, for example the left-hand edge of a tooth, and then to file the right-hand edge of the next adjacent tooth to the left of the first tooth, and so on. Ordinarily the teeth of a mill file are cut with the same slope or angle on both faces of the file, and when such a file is used for cutting the left-hand edge of a tooth, for example, the forward or cutting stroke of the file removes the chip or filing by a draw cut, the inclination of the file teeth being such that the file tends, as it moves forward, to approach the root of the saw teeth, thus insuring filing to the full depth of the tooth. On the other hand, when the opposite side of the ordinary file is applied to the other edge of the saw tooth, the inclination of the file teeth is now such that the forward or cutting stroke tends to lift the file from the work and to decrease the effectiveness of its action. Thus, the opposite sides of the saw tooth may not be filed uniformly unless great care be employed so that the saw fails to function as perfectly as desired.

In accordance with the present invention I make the teeth upon opposite sides of the file parallel with each other and instead of extending the file teeth diagonally across the entire width of the file, I provide each face of the file with two series of teeth, the teeth of the two series being inclined in opposite directions, producing a herring-bone effect. Thus constructed, each face of the file may be used with the same degree of effectiveness and the teeth of a saw may be filed with great uniformity.

When the file teeth are thus disposed in a herringbone arrangement, the user has available two independent sets of file teeth for use in filing each edge of a saw tooth, but to avoid dulling of the teeth of one series, while using the teeth of the other series upon the same face of the file, to prevent the operator from wearing out the center of the file faster than the edges, to compel the use of each series in turn, and to furnish an effective gauge to indicate the completion of the filing operation, I separate the two series of file teeth upon each side of the file by a narrow uncut and smooth portion of the surface of the file blank, such uncut portion extending lengthwise of the file and substantially midway of its width.

In using this improved file, the filing operation is continued until the predetermined tooth depth has been attained, whereupon the smooth uncut portion of the file comes into contact with the upper part of the saw tooth, causing the file to slip or at least to fail to cut properly, thus notifying the user that the tooth is completed. The presence of this blank portion also prevents accidental engagement of the inactive series of file teeth with the work so that the inner ends of the teeth of this inactive series do not become filled with chips, as might be the case were the two series to meet at the center of the file face.

Incidentally the presence of the blank place at the center of the file face is of utility in clearing the teeth of chips but this I regard as of secondary importance, although contributing to the life of the file.

In the accompanying drawings, I have shown certain preferred embodiments of the invention:

Fig. 1 being a face view of a flat mill file constructed in accordance with the present invention;

Fig. 2 is an edge elevation of the file of Fig. 1;

Fig. 3 is a view similar to Fig. 1, but showing the invention embodied in a triangular file;

Fig. 4 is a section substantially on the line 4—4 of Fig. 3;

Fig. 5 is a section substantially on the line 5—5 of Fig. 1, but to larger scale;

Fig. 6 is a diagrammatic view illustrating the mode of using the improved file; and Fig. 7 is a fragmentary section substantially on the line 7—7 of Fig. 1, but to larger scale.

Referring to the drawings, the numeral 1 designates the file as a whole, such file having the opposite parallel faces 1ª and 1ᵇ and being provided with the tang 2 and the tip 3. Each of the faces 1 and 1ª of this flat file is provided with two series of teeth 4 and 5, respectively, which are produced in accordance with any of the usual processes of file cutting. However, instead of extending entirely across the width of the file face, as is customary, the teeth of each series 4 and 5 extend somewhat less than half way across the face of the file, leaving between the series a blank space 6. This blank space is relatively narrow and extends longitudinally of the file face and substantially midway its width. This blank space is smooth and forms a portion of the original surface of the flat blank in which the teeth are cut.

Referring to Fig. 7, the cutting of file teeth is performed by means of a chisel-like tool which, as indicated in Fig. 7, raises the tips of the teeth T above the original plane P of the blank, while the roots R of the teeth extend below the plane P. Thus the plane P of the blank space 6 is disposed between the planes of the tips of the teeth T and the roots R of the teeth.

In preparing a flat file such as shown in Figs. 1 and 2, the cutting upon opposite sides of the blank is identical so that upon the face 1ª of the file the teeth of the left-hand series 4 are parallel with the corresponding series 4ª upon the face 1ᵇ, while likewise the teeth of the series 5 at the right-hand side of the file are parallel with the teeth 5ª of the series directly behind on the face 1ª.

The teeth of the series 4 and 5 diverge outwardly and forwardly toward the tip 3 of the file and preferably are of symmetrical inclination with respect to the longitudinal center line of the file. However, I contemplate that the inclination of the teeth of the two series may be different under some circumstances, as for example when the file is to be employed for some special use.

As shown, the edges of the file are cut with teeth, as indicated at 7, although for some purposes the edge may be left blank or smooth.

In Figs. 3 and 4, I have illustrated the invention as applied to a triangular file having the faces 9, 10 and 11. Each of these faces is furnished with two series 12 and 13 of teeth in the same way as the file shown in Fig. 1, the series 12 and 13 being separated by a blank space 14 provided by leaving the center part of the face uncut.

Referring to Fig. 6, a portion of a saw is indicated at S, such saw having a tooth 15 having opposite edges 16 and 17. In sharpening the right-hand edge 16 of the tooth, the file of Fig. 1 is applied as indicated at F and on the forward stroke the file teeth of series 4 engages the saw tooth for sharpening the same. In this figure, the file F is shown as having completed a cut with its edge 7 so that the blank portion 6 has come opposite to the top of the saw tooth, thus indicating that the cut is completed. At the other side 17 of the saw tooth I have indicated the file F′ at a time prior to the completion of a similar edge cut forming a part of the sharpening operation, the blank portion 6ª being spaced above the upper edge of the tooth.

I regard it as of prime importance that the uncut or blank portion at the center of the face be smooth and constitute a portion of the surface of the original blank, or, in other words, that such uncut space lie in a plane intermediate the planes of the tops and roots of the file teeth. With this arrangement, the engagement of this blank portion with the work causes the file to slip so that it serves as a gauge to notify the user that the cut is completed. Were this blank space to be grooved or otherwise depressed below the roots of the file teeth, it would no longer operate in this fashion, and would be of no utility for the purpose for which it is designed. Therefore, in referring to a blank or uncut portion, I wish it to be understood as indicating a surface which lies substantially in (or possibly above) the plane of the original surface of the file blank.

I claim:

A file made from a blank and having two series of teeth cut in each face thereof, the teeth of one series diverging from the teeth of the opposite series, and a blank uncut surface in each face extending lengthwise thereof and separating the two series of teeth on that face, the tops of the teeth being above such plane surface and the roots of the teeth being below such surface whereby when one series has completed its cutting operation the surface will engage the work and cause the file to slip thus indicating to the user that the cut with that series has been completed.

Signed by me at San Francisco, California, this 20th day of November, 1926.

WILLIAM E. GIBBS.